United States Patent [19]

Hyde

[11] 4,030,850

[45] June 21, 1977

[54] INTERLOCKED JOINT

[75] Inventor: George S. Hyde, Sparta, N.J.

[73] Assignee: The United States of America as represented by the Secretary of the Army, Washington, D.C.

[22] Filed: Aug. 2, 1976

[21] Appl. No.: 710,941

[52] U.S. Cl. ............................... 403/288; 403/333; 403/361; 285/DIG. 22; 220/306; 220/308

[51] Int. Cl.$^2$ .......................................... F16D 1/00

[58] Field of Search .......... 403/288, 360, 361, 292, 403/332, 333, 334; 285/374, DIG. 22, 307, 332.2, 332.3, 260; 220/308, 306

[56] References Cited

UNITED STATES PATENTS

| 2,889,089 | 6/1959 | Herrick et al. | 285/DIG. 22 |
| 2,889,847 | 6/1959 | Schober | 285/DIG. 22 |
| 3,596,940 | 8/1971 | Horwitt et al. | 403/360 |
| 3,664,544 | 5/1972 | Hammes | 220/308 |
| 3,784,235 | 1/1974 | Kessler et al. | 285/DIG. 22 |
| 3,912,110 | 10/1975 | Hammes | 220/308 X |
| 3,921,850 | 11/1975 | Powers | 220/308 |
| 3,990,727 | 11/1976 | Gallagher | 285/DIG. 22 |

Primary Examiner—Wayne L. Shedd
Attorney, Agent, or Firm—Nathan Edelberg; A. Victor Erkkila; Max Yarmovsky

[57] ABSTRACT

A conjugate pair of self-aligning joints are formed in the peripheral edges of a relatively thick walled hemisphere which when brought together form a hermetically sealed ball shaped container. The interlocked joint utilizes oppositely disposed, grooved, deflecting flanges which nestle and lock one within the other. The hemispheres after being forcibly pushed together have an interlocked joint therein which resists inadvertent disassembly due to vibration or shock.

5 Claims, 2 Drawing Figures

INTERLOCKED JOINT

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to join hollow, relatively thick-walled hemispheres and cylinders into a permanent unitary asembly. The prior art devices generally utilize protruding key or ribs in the peripheral edge of one number to fit into mating slots or grooves of the other member. Adjacent matching undercut flanges that protrude from a commom equatorial region of each member are usually encircled by a separate cylindrical "U"shaped band that is slipped over, staked or crimped to mechined flange edges of mated members in order to form a container or unitary member. Some prior art heavy-walled joining devices utilize a keyed system of aligned hollow hemispheres which are totally enclosed in a separate set of thin walled hemispheres or overlays that are crimped at the intersecting plane of contact. One of the problems with this latter method of construction was that a crimp was formed which protruded beyond the main diameter of the device. In missile applications, having many submunitions contained therein, the aforementioned prior art devices were unsatisfactory because they did not efficiently utilize the limited space available in a missile warhead. Devices utilizing protruding flanges and rolled or crimped faces generally reduce the overall cargo capability of any given dispenser. In addition there were problems with the prior art devices in munition applications because they were susceptible to separation upon impact, and because frequently intact duds could readily be disassembled and reworked by an enemy to be reused quickly against friendly personnel.

SUMMARY OF THE INVENTION

The present invention relates to a deflecting joint for mechanically interlocking two relatively thick walled, 0.100 of an inch or more, hollow members which may be hemispherical or cylindrical in shape into a permanently assembled whole which is generally incapable of easy disassembly except by physical destruction or deformation of the constituent elements. The present invention provides for a joint which can be utilized in a container having matched deflecting, self aligning, and interlocking members which when forcibly brought together make an hermetically sealed joint.

An object of the present invention is to provide for a deflecting type interlocked joint for a spherical container which has no protruding elements for fastening the hemispherical component halves of the container together.

Another object of the present invention is to provide for a deflecting type interlocked joint for a container device which cannot be easily separated except by physical destruction or deformation of the container component members.

Another object of the present invention is to reduce the cost of manufacturing a thick walled sphere which is manufactured from hemispherical members having deflecting interlocked joints thereon.

A further object of the present invention is to provide a deflecting interlocked joint for a spherical container which is suitable for use as a submunition because it permits larger total cargo to be carried by the missile warhead.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 1:
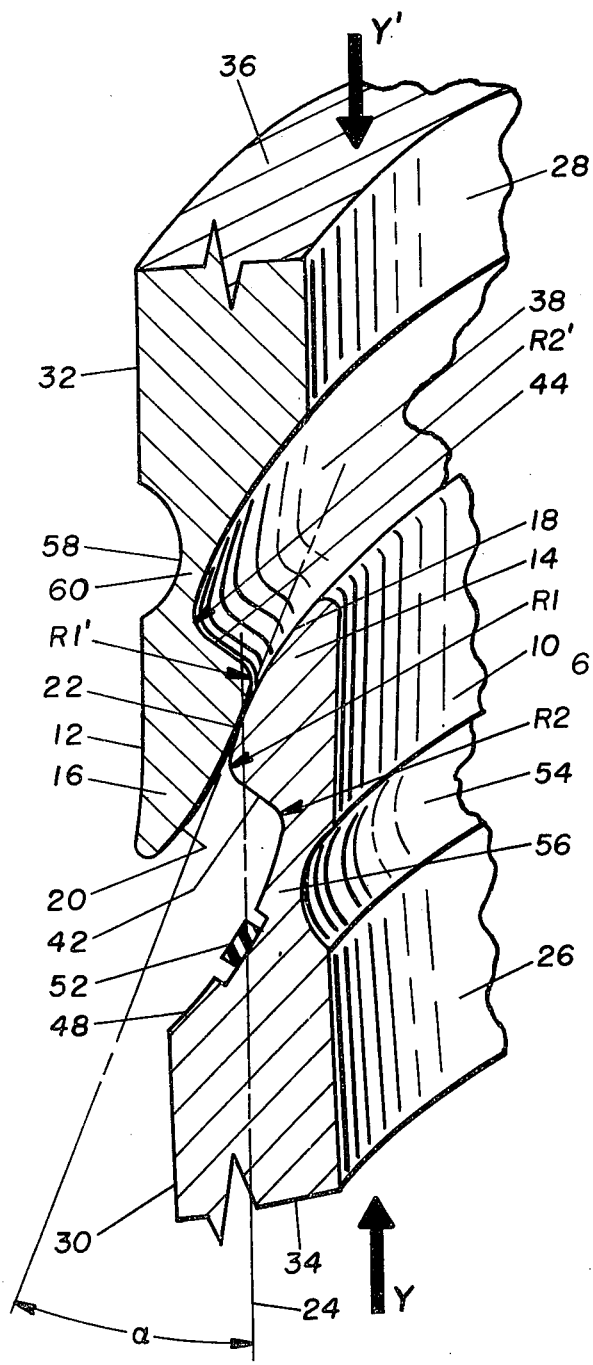
FIG. 1 is an enlarged partial cutaway cross-sectional view of the peripheral edges of the joints of opposing wall sections of a hemispherical container or cylindrical section of a tubular member prior to their being forcibly pushed together into an interlocked position.
Figure 2:
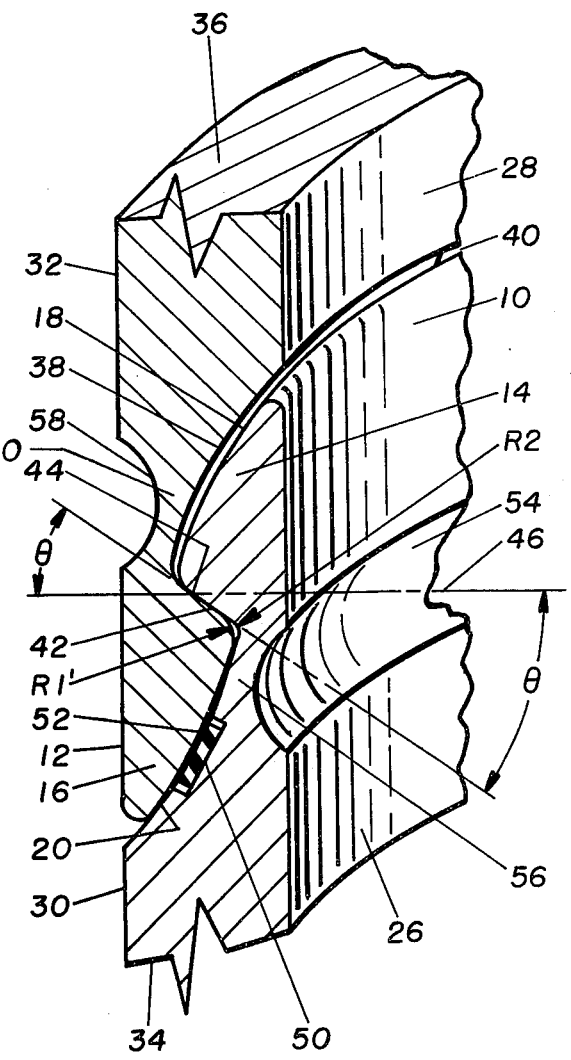
FIG. 2 is an enlarged partial cutaway cross-sectional view of the peripheral edges of the joints shown in FIG. 1 after they have been forcibly pushed together into an interlocked position.

Referring now to FIGS. 1 and 2 the hollow male joint member 10 and hollow female joint member 12 have equal and opposing triangular shaped annular flanges 14 and 16 respectively located on a peripherial edge. The flanges 14 and 16 each have male and female convex flanks 18 and 20 located thereon respectively. The flanks 18 and 20 are tangentially in mutual line contact, at point 22, with each other along a sliding plane having an acute angle $\alpha$, such as an angle of approximately 25°, with a vertical line 24 which is located midway between the interior walls 26 and 28 and exterior walls 30 and 32 of the male and female sections 34 and 36 respectively. Female section 36 has annular female flank groove 38 therein located on interior wall 28 which permits male flange 14 to seat therein, with a small relieving clearance 40 therebetween. Male flange 14 and female flange 16 have annular shouler sections 42 and 44 which are disposed adjacent to the flanks 18 and 20 respectively. The shoulders 42 and 44 are inclined at an acute angle $\theta$, with respect to horizontal line 46 passing transversely through the male and female joint members and are in contact with each other when the joint is in its locked position shown in FIG. 2. Angle $\theta$ can vary between 0° and 45° without affecting the joints locking capability. In addition the radii of curvatures R1 and R1' are made larger than the radii of curvatures R2 and R2', of the flanges 14 and 16 respectively, to assure good fit between the joint flange sections when in an interlocked position as shown in FIG. 2. Male section 34 has an annular male flank groove 48 therein, located in exterior wall 30 adjacent to the shoulder 42, and contains an annular gasket groove 50 for holding an annular compliant gasket 52 therein. The gasket 52 is squeezed intermediate female flank surface 20 and the gasket groove 50 to effect an hermetic seal. A first annular deflecting groove 54 is located in the interior wall 26 of the male section 34 to create a male necked down flange section 56 to allow male flange 14 to deflect without exceeding the elastic limit of the material. Similarly, a second annular deflecting groove 58 is located in the exterior wall 32 of the female section 36 to create a female necked down section 60 to allow the female flange 16 to deflect without exceeding the elastic limit of the material used in the female section 36.

In operation, a force, in the direction shown by arrows Y, Y', is exerted against male and female sections 34 and 36 respectively so that flanges 14 and 16 deflect oppositely from each other until the sections 34 and 36 are forced into conjugate assembly, as shown in FIG. 2, to form an interlocked hermetically sealed joint which will resist inadvertent disassembly due to either vibration or shock impacts such as found in munition warhead applications.

The foregoing disclosure and drawings are merely illustrative of the principles of this invention and are not to be interpreted in a limiting sense. I wish it to be understood that I do not desire to be limited to the exact details of construction shown and described for obvious modification will occur to a person skilled in the art.

Having thus fully described the invention, what is claimed as new and desired to be secured by Letters Patent of the United States is:

1. An interlocked joint which comprises:

a hollow male section having an annularly triangularly shaped male flange located on a peripheral edge of said hollow male section, said male flange having a convex male flank surface disposed on an exterior wall of said male section, a male shoulder section positioned adjacent to said male flank surface, an annular male flank groove located adjacent to said male shoulder section, said male flank groove having an annular gasket groove operatively disposed therein, and a first annular deflecting groove disposed in an interior wall of said male section, said male flank groove and said first annular deflecting groove being oppositely positioned on said hollow male section to provide a male necked down flange section;

a hollow female section having an annularly triangularly shaped female flange located on a peripheral edge of said hollow female section, said female flange having a convex female flank surface disposed on an interior wall of said female section, a female shoulder section positioned adjacent to said female flank surface, an annular female flank groove located adjacent to said female shoulder section, a second annular deflecting groove disposed in an exterior wall of said female section, said female flank groove and said second annular deflecting groove being oppositely on said hollow female section to provide a female necked down flange section; and gasket means proximately disposed in said annular gasket groove for providing an hermetic seal between said male section and said female section when said hollow male and female sections are axially aligned with each other and forcibly pushed into interlocking engagement with each other, said male and female flanges being deflected away from each other when said male and female flank surfaces slide over each other, said male flange entering into said female flank annular groove and said female flange entering into said male flank annular groove to permit said male and female shoulder sections to make contact with each other and to resist movement of said male and female sections away from each other.

2. An interlocked joint as recited in claim 1 wherein said male and female flanges have convex surface being tangentially in mutual line contact with each other along a sliding plane having an acute angle $\alpha$ with a vertical line located midway between the interior and exterior walls of said male and female sections when said hollow male and female sections are axially aligned and forcibly brought into contact with each other.

3. An interlocked joint as recited in claim 2 wherein said acute angle $\alpha$ is equal to an angle of 25°.

4. An interlocked joint as recited in claim 1 wherein said male and female shoulder sections when in contact with each other are inclined at an acute angle $\theta$ with respect to a horizontal line passing transversely through said hollow male and female sections.

5. An interlocked joint as recited in claim 4 wherein said acute angle $\theta$ may vary from 0° to 45°.

* * * * *